(12) United States Patent
Koch et al.

(10) Patent No.: US 8,327,255 B2
(45) Date of Patent: Dec. 4, 2012

(54) COMPUTER PROGRAM PRODUCT CONTAINING ELECTRONIC TRANSCRIPT AND EXHIBIT FILES AND METHOD FOR MAKING THE SAME

(75) Inventors: Kevin Koch, Grand Junction, CO (US); Grover Mundell, Aurora, CO (US)

(73) Assignee: West Services, Inc., Eagan, MN (US)

( * ) Notice: Subject to any disclaimer, the term of this patent is extended or adjusted under 35 U.S.C. 154(b) by 449 days.

(21) Appl. No.: 10/710,796

(22) Filed: Aug. 3, 2004

(65) Prior Publication Data

US 2005/0043958 A1 Feb. 24, 2005

Related U.S. Application Data

(60) Provisional application No. 60/494,061, filed on Aug. 7, 2003.

(51) Int. Cl.
*G06F 17/00* (2006.01)

(52) U.S. Cl. ....................................................... 715/209

(58) Field of Classification Search .................. 709/204; 395/600; 707/101; 715/500, 200, 201, 202, 715/203, 204, 209
See application file for complete search history.

(56) References Cited

U.S. PATENT DOCUMENTS

| | | | |
|---|---|---|---|
| 3,670,310 A | 6/1972 | Bharwani et al. | |
| 4,959,769 A | 9/1990 | Cooper et al. | |
| 5,062,074 A | 10/1991 | Kleinberger | |
| 5,148,366 A | 9/1992 | Buchanan et al. | |
| 5,157,783 A | 10/1992 | Anderson et al. | |
| 5,267,155 A | 11/1993 | Buchanan et al. | |
| 5,392,428 A | 2/1995 | Robins | |
| 5,745,754 A | 4/1998 | Lagarde et al. | |
| 5,752,025 A | 5/1998 | Shakib et al. | |
| 5,779,915 A | 7/1998 | Becker et al. | |
| 5,801,685 A * | 9/1998 | Miller et al. | 715/500.1 |
| 5,809,318 A | 9/1998 | Rivette et al. | |
| 5,832,171 A * | 11/1998 | Heist | 386/241 |
| 5,845,301 A | 12/1998 | Rivette et al. | |
| 5,848,301 A | 12/1998 | Nonaka | |
| 5,848,409 A | 12/1998 | Ahn | |
| 5,877,772 A | 3/1999 | Nomura et al. | |
| 5,926,652 A | 7/1999 | Reznak | |
| 5,950,194 A | 9/1999 | Bennett et al. | |
| 5,950,214 A | 9/1999 | Rivette et al. | |
| 5,960,448 A | 9/1999 | Reichek et al. | |
| 5,978,820 A | 11/1999 | Mase et al. | |

(Continued)

OTHER PUBLICATIONS

Garrett H. Byrne, Automated court case management in the prosecutor's office, Dec. 1997, ACM Press, vol. 4, Issue 7, pp. 10-24.*

(Continued)

*Primary Examiner* — Laurie Ries
(74) *Attorney, Agent, or Firm* — Pillsbury Winthrop Shaw Pittman LLP (57) ABSTRACT

The present invention provides a computer program product that includes electronic transcripts, exhibits, and an association therebetween. In one example, the method includes providing one or more electronic transcript files; providing one or more exhibit files associated with the one or more electronic transcript files; and providing an executable viewer file. The transcript and exhibit image files and their association, as well as the executable viewer file, may be stored in a local, remote, or removable media. In this manner, a user can activate the viewer and view the electronic transcripts and associated exhibits without the need for any additional software.

44 Claims, 5 Drawing Sheets

U.S. PATENT DOCUMENTS

| | | | |
|---|---|---|---|
| 5,991,751 A | 11/1999 | Rivette et al. | |
| 5,991,780 A | 11/1999 | Rivette et al. | |
| 6,014,663 A | 1/2000 | Rivette et al. | |
| 6,018,749 A | 1/2000 | Rivette et al. | |
| 6,018,801 A * | 1/2000 | Palage et al. | 726/2 |
| 6,026,395 A | 2/2000 | Bennett et al. | |
| 6,029,182 A | 2/2000 | Nehab et al. | |
| 6,052,657 A | 4/2000 | Yamron et al. | |
| 6,055,531 A | 4/2000 | Bennett et al. | |
| 6,098,070 A | 8/2000 | Maxwell | |
| 6,112,172 A | 8/2000 | True et al. | |
| 6,223,186 B1 | 4/2001 | Rigault et al. | |
| 6,230,173 B1 * | 5/2001 | Ferrel et al. | 715/205 |
| 6,249,784 B1 | 6/2001 | Macke et al. | |
| 6,263,336 B1 | 7/2001 | Tanaka | |
| 6,339,767 B1 | 1/2002 | Rivette et al. | |
| 6,389,434 B1 | 5/2002 | Rivette et al. | |
| 8,389,428 | 5/2002 | Rigault at al. | |
| 6,421,659 B1 | 7/2002 | Nomura | |
| 6,499,026 B1 | 12/2002 | Rivette et al. | |
| 6,751,609 B2 | 6/2004 | Nomura | |
| 6,792,574 B1 | 9/2004 | Sugiyama | |
| 6,810,382 B1 | 10/2004 | Wamsley et al. | |
| 6,850,252 B1 * | 2/2005 | Hoffberg | 715/716 |
| 6,877,137 B1 | 4/2005 | Rivette et al. | |
| 7,107,278 B1 | 9/2006 | Bandemer | |
| 7,168,035 B1 * | 1/2007 | Bell et al. | 715/234 |
| 7,296,217 B1 * | 11/2007 | Earnshaw et al. | 705/317 |
| 2001/0034743 A1 * | 10/2001 | Thomas | 707/501.1 |
| 2003/0058277 A1 * | 3/2003 | Bowman-Amuah | 345/765 |
| 2003/0078973 A1 * | 4/2003 | Przekop et al. | 709/204 |

OTHER PUBLICATIONS

Page et al.,"Its About Time: Link Streams as Continuous Metadata", ACM 2001, pp. 93-102.*

* cited by examiner

COMPUTER PROGRAM PRODUCT CONTAINING ELECTRONIC TRANSCRIPT AND EXHIBIT FILES AND METHOD FOR MAKING THE SAME

The present application claims the benefit of U.S. Provisional Patent Application Ser. No. 60/494,061, filed. Aug. 7, 2003, entitled "Computer Program Product Containing Electronic Transcript and Exhibit Files and Method for Making Same," the contents of which are hereby incorporated by reference in their entirety.

BACKGROUND OF INVENTION

During a court proceeding such as a deposition, hearing, trial or other proceeding, court reporters transcribe the words spoken into court transcripts. Often times during court proceedings, various exhibits, such as documents, pictures, maps, charts, or the like, are used or referred to.

A court reporter may provide an electronic version of the transcript of the court proceedings to a customer, such as an attorney. But delivery of the exhibits with the electronic version is difficult to coordinate. For example, a court reporter may email the electronic version of the transcript to the attorney. But the exhibits associated with the transcript must be mailed with a paper version of the transcript. Methods of delivery other than email and/or postal mail are of course contemplated and generally known in the art.

Alternative to mailing a paper copy of the exhibits with the paper version of the transcript, a court reporter may scan the exhibits onto a medium, such as a CDROM, and deliver the scanned version to the attorney along with the transcript. However, there is no appreciable coordination between the electronic version of the transcript and the electronic version of the exhibits.

It is against this background that various embodiments of the present invention were developed.

FIELD OF THE INVENTION

The present invention relates, in general, to the delivery of electronic transcripts and exhibits from court proceedings.

SUMMARY OF INVENTION

In light of the above and according to one broad aspect of one embodiment of the invention, disclosed herein is a computer program product, such as a memory file that includes one or more electronic transcript files; one or more exhibit files associated with the one or more electronic transcript files; and a viewer file. In one example, the one or more exhibit files are associated with one of the electronic transcript files at a first occurrence (such as at a page and line number) of the exhibit file within the electronic transcript file. In another example, the one or more exhibit files are associated with all of the occurrences. In still another example, the one or more exhibit files are associated with the electronic transcripts by links designated by a user.

In one embodiment, the viewer has a user interface including, for example, a first window for viewing the electronic transcript file and a second window for viewing the exhibit file. Preferably, the first and second windows may be simultaneously displayed. In another example, a window may be open for each transcript file and each exhibit file currently activated by the view.

In another example, the executable viewer has a user interface including an electronic transcript pane displaying a list of the one or more electronic transcript files, and may also include an exhibit pane displaying a list of the one or more exhibit files.

According to another broad aspect of one embodiment of the invention, disclosed herein is a method for forming a memory file that may be stored and accessed by a local processor, a remote processor over a network connection, or from an external media source such as a CDROM, a DVD, a magnetic disk, a tape drive or the like. In one example, the method includes providing one or more electronic transcript files; providing one or more exhibit files associated with the one or more electronic transcript files; and providing an executable viewer file. The transcript and exhibit image files and their association, as well as the executable viewer file, may be saved to a memory file, saved in a magnetic file, or burned onto an optical file, such as, for example, a DVD or CDROM. In this manner, a user can activate the viewer and view the electronic transcripts and associated exhibits without the need for any additional software. Notice, the transcript files and exhibit files do not necessarily need to be associated with anything in particular. For example, a transcript that did not have any exhibits is not associated with an exhibit file.

Other embodiments of the invention are disclosed herein. The foregoing and other features, utilities and advantages of various embodiments of the invention will be apparent from the following more particular description of the various embodiments of the invention as illustrated in the accompanying drawings and claims.

DETAILED DESCRIPTION

Disclosed herein is a computer program product, such as a memory file (which may be or include an executable file), CDROM, or the like, and a method for forming the computer program product so that the computer program product includes at least one electronic transcript and at least one exhibit associated with at least one of the at least one electronic transcripts, and a viewer for viewing the electronic transcript and the exhibits associated therewith. In one embodiment, at least one exhibit is associated with at least one electronic transcript, although the association can take several forms, for example, the association could be at the first reference to the exhibit (i.e., the first page and line number referencing the exhibit) contained within the electronic transcript, at all references in the electronic transcript, or at places designated by the user. Further, by activating the association, the view would display the exhibit file. In this manner, the computer program product can be created, for instance by a court reporter, and provided to a user, such as an attorney, for viewing the electronic transcript and the associated exhibits. Various embodiments of the present invention will now be described.

Figure 1:
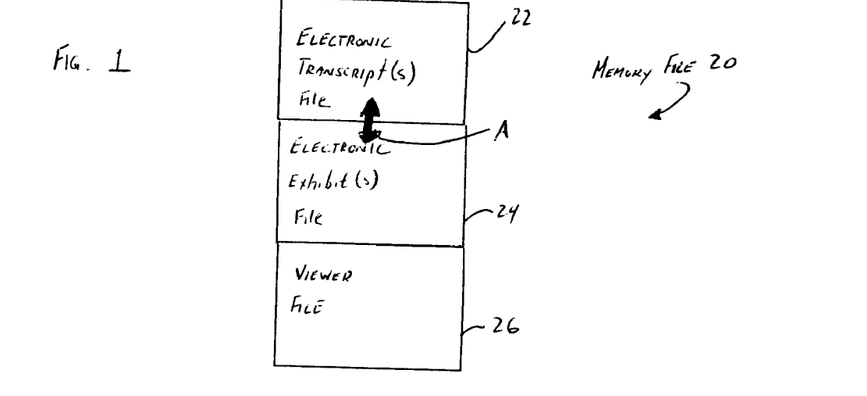
FIG. 1 illustrates a block diagram of a computer program product, such as a memory file, CDROM, optical disk, web page, or the like, in accordance with an embodiment of the present invention.

Referring to FIG. 1, FIG. 1 illustrates an example of a computer program product 20, such as a memory file, accessible through a local processor, remotely over a network, or through a processor's external/media drive, in accordance with one embodiment of the present invention. As shown in FIG. 1, the computer program product 20 includes one or more electronic transcripts 22, one or more exhibit files 24, wherein at least one exhibit file 24 is associated with at least one of the electronic transcripts 22, and a viewer file 26 that, when activated, permits viewing of the electronic transcripts 22 and the associated exhibit files 24 stored on the computer program product 20. Notice, computer program product 20 may be stored over one or more processors that may be connected locally or remotely through, for example, a local area network, a wide area network, WiFi, other wireless networks, optical connections, Ethernets, Internets, World Wide Web, or the like.

The viewer file is provided in the event the appropriate viewer is not already available on the user's processor. If an appropriate view is already available, the view file may be used from the viewer stored on the user's processor. Alternatively, the view associated with the computer program product may be used.

Electronic transcripts 22 may include files that are electronic versions of transcripts from court proceedings such as depositions, trials, hearings, etc. The one or more exhibit 24 may include electronic exhibits may include, for example, images of the actual exhibits or copies of the exhibits. The exhibits 24 included within the computer program product may be in various digital formats, including, for example, video, audio, video/audio, animation, still images, TIF, PDF, JPG, bitmap, GIF format, or the like. The viewer 26, or locally accessible viewer, associated with product 20 provides a user controllable display of the electronic transcript 22 and the exhibits 24 associated therewith. Viewer 26 may be a single software module, but viewer 26 may also provide access to several viewer software modules to view different types of exhibit files. For example, audio/video may be played over a Windows Media Player and a text file may be displayed using a pdf viewer, such as Adobe® Acrobat®.

Figure 6:
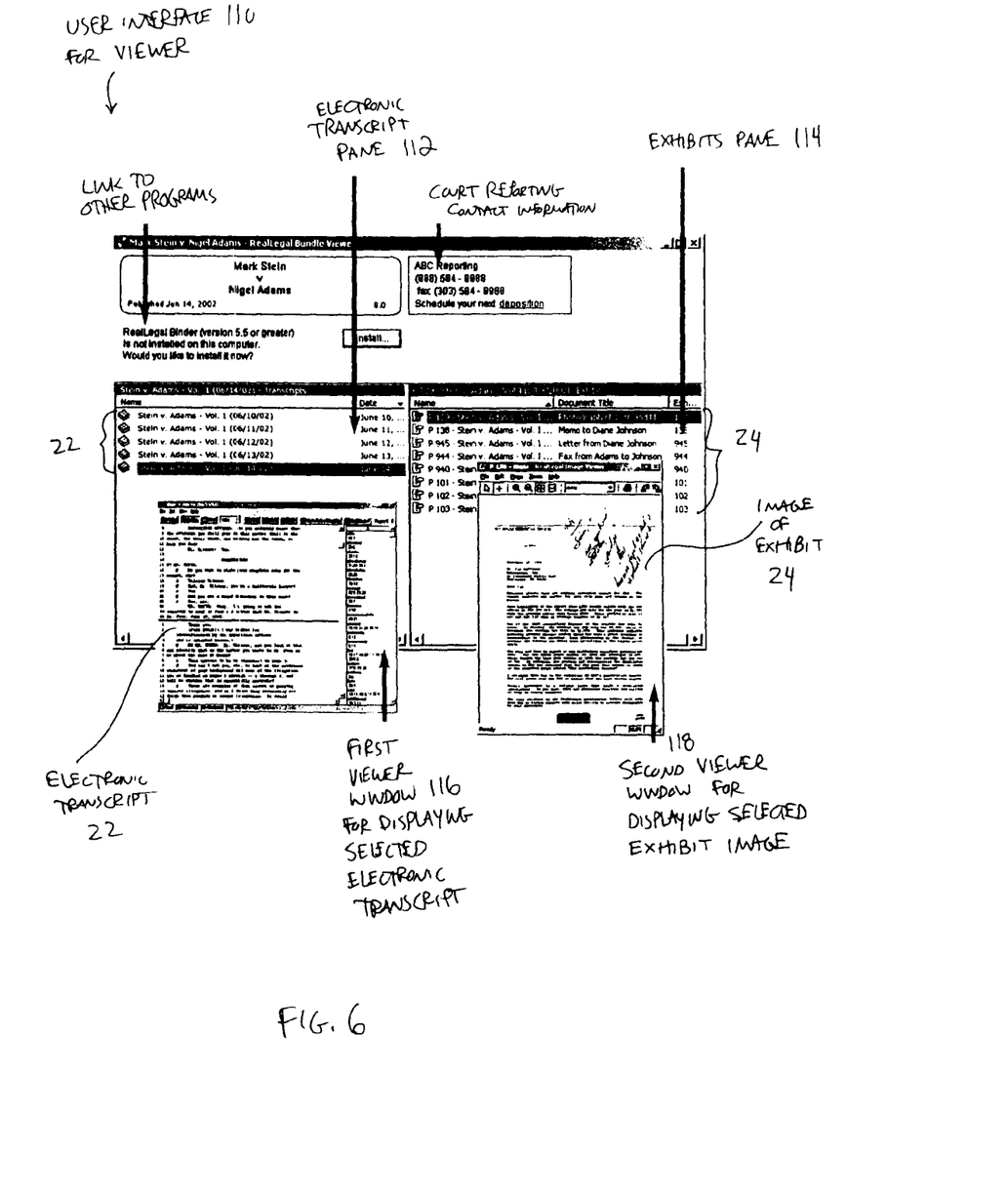
FIG. 6 illustrates an example display screen of a viewer program for selectively viewing electronic transcripts and associated exhibits contained within a memory file, in accordance with an embodiment of the present invention.

In one example, as shown in FIG. 6, the viewer 26 may provide a first window 116 for displaying and scrolling through the electronic transcript 22, and at least a second window 118 for displaying one or more exhibits 24 associated with the transcript 22. Exhibits could be displayed in different windows or be different views in a single window. In one example, the second window 118 of the viewer 26 for viewing exhibits permits the user to zoom, rotate, and scroll through multiple pages of an exhibit, or view the exhibit, using a best fit window sizing, if desired. In another example, the second window 118 of viewer 26 provides an audio/video feed.

Figure 2:
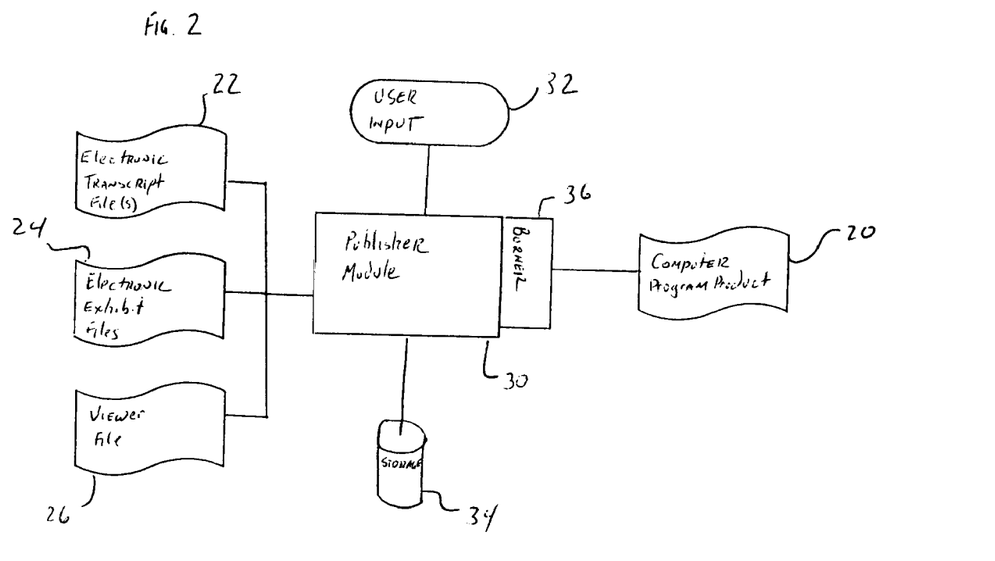
FIG. 2 illustrates a block diagram of a publisher module for creating a memory file, in accordance with an embodiment of the present invention.

Referring to FIG. 2, FIG. 2 illustrates a block diagram of a publisher module or application 30 for creating a product 20, in accordance with an embodiment of the present invention. As shown in FIG. 2, the publisher module 30 receives one or more electronic transcripts 22 and one or more exhibit file 24, and through user input 32, creates bundles or memory files that the user may publish to product 20. The bundles can be stored in local memory storage 34 if desired. Further, the publisher module 30 is capable of including viewer file 26 on the product 20 as well. As will be described below, the publisher module 30 permits a user to create a product 20 that contains one or more electronic transcripts 22, and for each electronic transcript, the user is able to associate one or more exhibit images 24 with a particular electronic transcript 22. In this manner, once the product is written to a memory device, such as by using a CDROM burner 36, the selected electronic transcript 22 and exhibit files 24, along with the viewer file 26, may be used by the end user of the product 20 to easily view and read an electronic transcript 22 and its associated exhibits 24. Of course, the product 20 could be written using convention memory, using a convention to convert the files to a HTML format, etc.

The various components shown in FIG. 2 could be arranged locally on a single processor, or the various components may be accessible remotely over a network. For example, the user at a local processor may access a publisher module located at a remote server. The electronic transcript 22, exhibits 24, and viewer file 26 may all be accessible by the publisher module 30 over local buses or remotely over the same or a different network connection.

Figure 3:
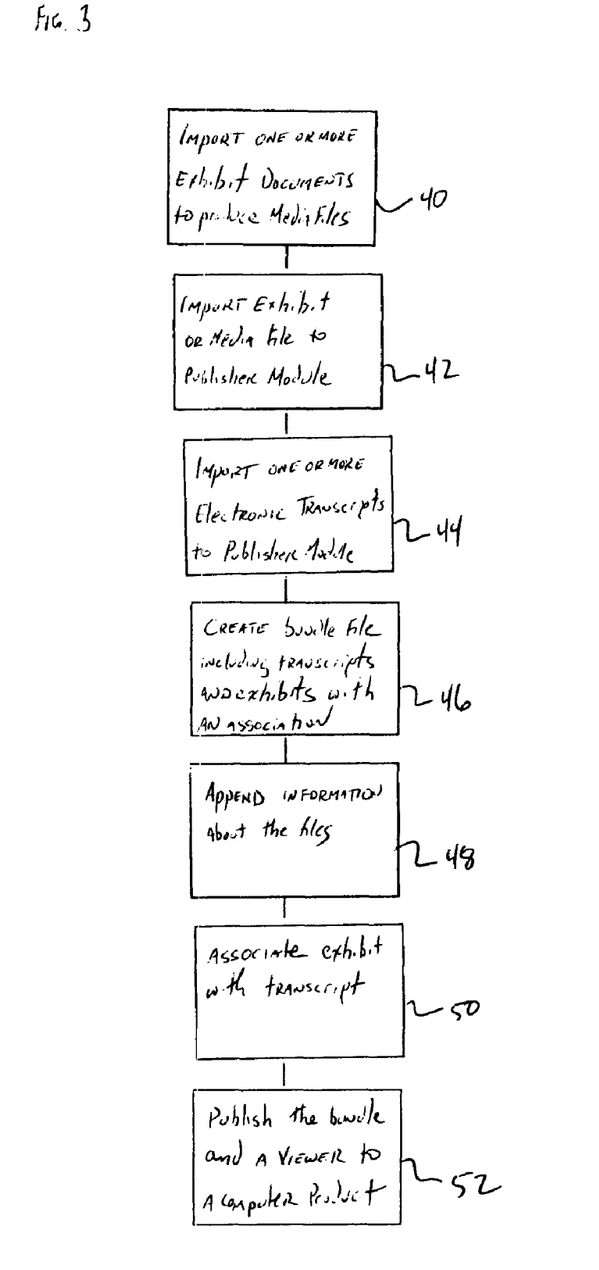
FIG. 3 illustrates an example of logical operations for creating a memory file, in accordance with an embodiment of the present invention.

Referring to FIG. 3, FIG. 3 illustrates an example of logical operations for creating a computer program product, such as a memory file, a CDROM, a magnetic disk or the like, that contains electronic transcripts, exhibits, and an executable viewer. At operation 40, one or more exhibits are imported to produce media files thereof, audio files, video files, audio/video files, still images, etc. For non-electronic files, such as paper exhibits, a conventional scanner may be used to scan the exhibit and produce an electronic image file of the exhibit, which may be, for example, in the format of TIF, PDF, JPG, bitmap or GIF formats for example. For video, such as video depositions, the video can be converted to digital format such as an MPEG format or the like.

At operation 42, one or more exhibits are imported into a publisher module or application 30. And at operation 44, one or more electronic transcript files may be imported into the publisher application. The publisher module may be adapted to receive exhibits and electronic transcripts and permit a user to associate one or more exhibits with one or more electronic transcripts and bundle the electronic transcripts, exhibits, and viewer in a computer program product 20. Further, the publisher application 44 provides for a user to be able to select one or more transcript files for inclusion in Product 20. In operation 46, a bundle file is created including one or more of the exhibits and one or more of the electronic transcript files. In one example, the bundle file can be named by the user so as to permit the user to track and organize various bundle files containing various different electronic transcripts and exhibits. Multiple exhibits may be associated with a single electronic transcript and multiple electronic transcripts may be associated with a single exhibit, for instance, where an electronic transcript of a deposition may have multiple exhibits referenced during the deposition.

At operation 48, information about an exhibit may be appended, if desired, by the user, and included within the bundle of files. For instance, if the user desires, the user may enter the dates of the exhibits, the Bates page number ranges used by a particular exhibit, or other information about an exhibit. At operation 50, for each exhibit included in the bundle and associated with the electronic transcript, the exhibit is associated with a particular entry in the electronic transcript, such as, for example, page number and line number where the exhibit is first referenced in the electronic transcript, every reference in the transcript, or as desired by a user. In this way, the exhibit is associated with the electronic transcript. Such an association or link may be made between each exhibit and the electronic transcript that references the exhibit. The association may be activated by any conventional methods, such as, clicking on the link to open a new window, placing a pointer over the link, a light pen, keyboard manipulation, or other conventional controls. At operation 52, the electronic transcript, the associated exhibits, and the viewer are published, saved, or burned onto the computer program product, such as a memory file, accessible via a network, a local processor, or external media drive, such as a CDROM.

Figure 4:
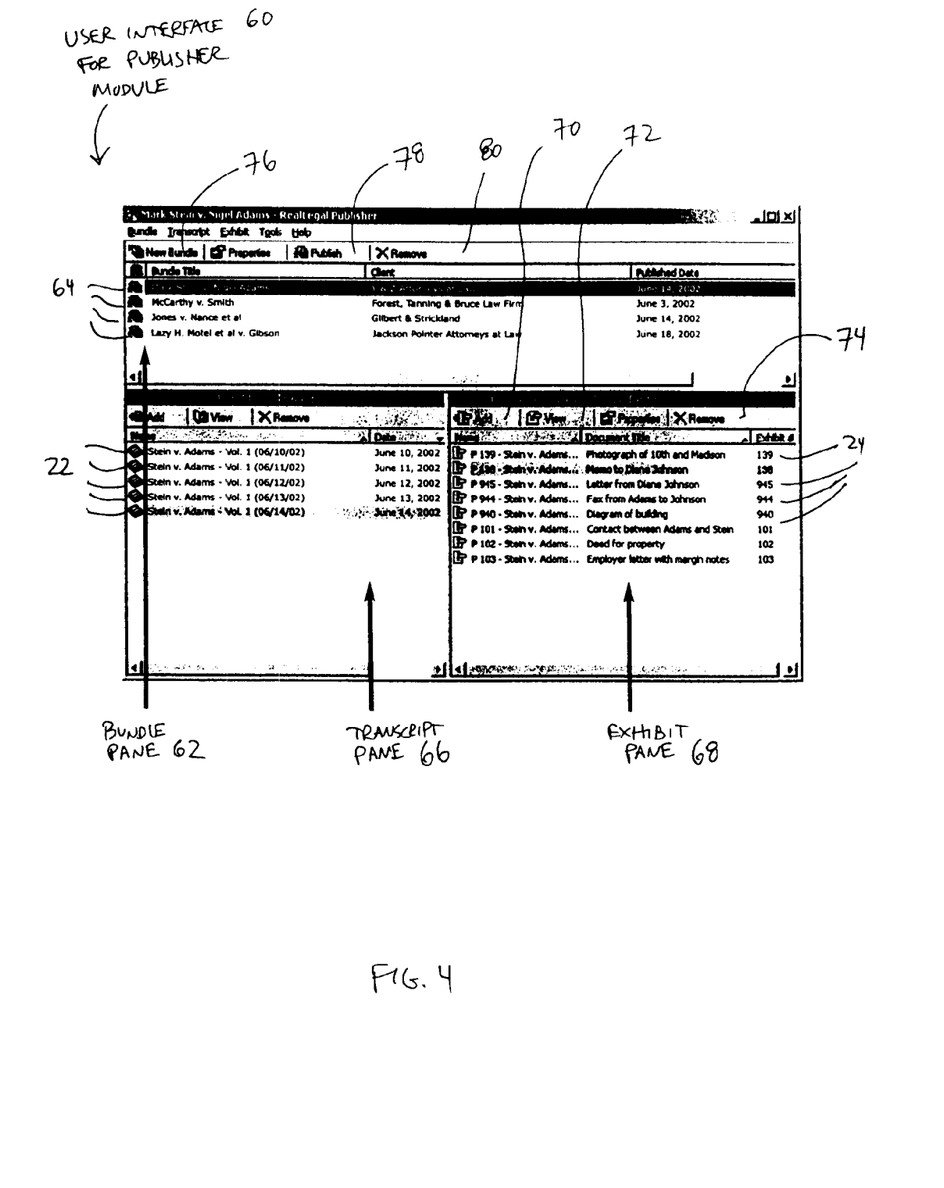
FIG. 4 illustrates an example display screen of a publishing application for creating a memory file having electronic transcripts and exhibits contained therein, in accordance with an embodiment of the present invention.

Referring to FIG. 4, one example of a publishing application display or user interface 60 is illustrated. In the example of FIG. 4, the display 60 includes a bundle pane 62 that lists the various bundles 64 that have been created and stored in the storage device 34; a transcript pane 66 having controls for adding, viewing, and removing transcripts 22 from the associated bundle 64; and an exhibit pane 68 having controls 70, 72, 74 for adding, viewing, and removing particular exhibits 24 from the bundle 22.

In the bundle pane 62, a plurality of bundles 64 are listed that have been created by a user. In the bundle pane 62, controls are provided for new bundle creation control 76, a publish control 78 for publishing a bundle, and a remove or deletion control 80 for deleting a bundle 84. These controls operate with reference to one or more bundle files or collections 64 listed in the bundle pane 62.

As described above, each bundle file 64 is adapted to contain one or more electronic transcripts 22 and one or more exhibit 24, and for each electronic transcript 22 and exhibits 24 contained in the bundle 64 cross references are established. Accordingly, as shown in FIG. 4, for the selected bundle 64 there are five electronic transcripts 22 presently contained in the bundle file 64.

In the transcript pane 66, a user may add or remove electronic transcripts 22 from the selected bundle 64. As the user selects various electronic transcripts 22, in the exhibit pane 68, the user may add or remove one or more exhibits 24. For instance, in the example of FIG. 4, for the highlighted transcript 22 selected in the transcript pane 66, there are eight exhibits 24 presently associated therewith although all of the listed exhibits 24 do not need to be associated with the highlighted transcript. As mentioned above, preferably the publisher application associates or creates a data link between the exhibit 24 and electronic transcript 22. In the exhibit pane 68, the name of the exhibit file and the exhibit number may be fields associated with each exhibit 24, more or less, or different fields are possible.

Once the user has added all of the desired transcripts to the bundle 64 and each of the exhibits 24 is associated with the appropriate electronic transcript or transcripts 22, then the user may select the publish control 78 in the window 60 to publish, save, burn, or the like, the bundle to a product 20 along with a viewer executable file.

Figure 5:
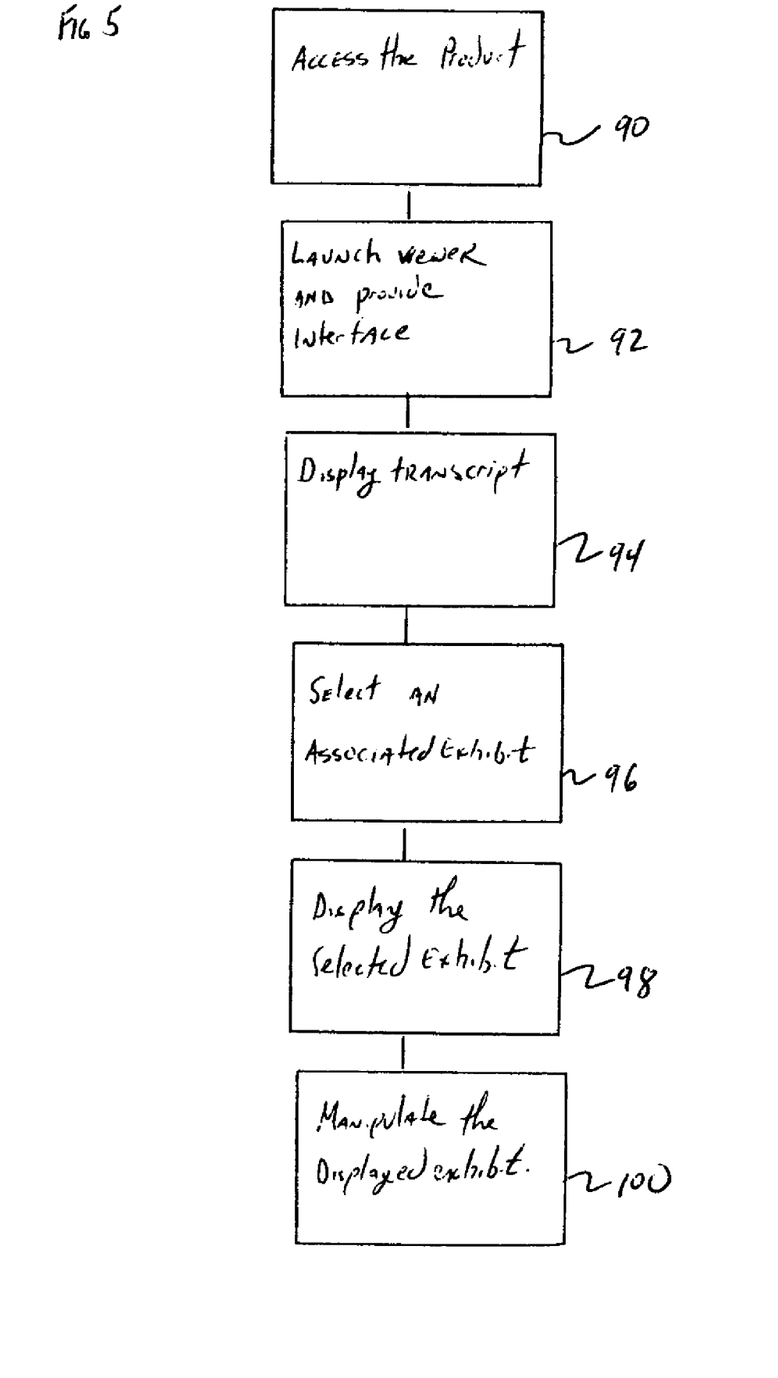
FIG. 5 illustrates an example of logical operations for using a memory file made in accordance with an embodiment of the present invention.

Referring to FIG. 5, FIG. 5 illustrates an example of logical operations for using a computer program product such as a file or a CDROM created by an embodiment of the present invention. At operation 90, the user accesses the product via the user's processor. The access could be via a local media drive, a network connection to a remote processor, or the like. At operation 92, the viewer is launched and provides a user interface for the user to view transcripts and exhibits associated therewith. The view could be self-executable such that the viewer module launches or needs an execution command input by the user. The viewer loads applications as necessary. One example of the user interface is illustrated in FIG. 6, described below. At operation 94, a transcript is displayed in the viewer, and at operation 96, the user may select an exhibit referenced in the electronic transcripts for viewing. At operation 98, the exhibit is displayed preferably in a separate window than the window displaying the transcript. At operation 100, if desired, the user may manipulate the electronic transcript, such as by searching, annotating, creating reports, or other functions or operations, such as described in U.S. patent application Ser. No. 09/920,443, entitled "Transcript Management Software and Method Therefor," filed Jul. 31, 2001, which issued as U.S. Pat. No. 6,869,018 on Mar. 22, 2005, the contents of which are hereby incorporated by reference in their entirety. Bundles may also be imported into other software programs for use therein.

Referring now to FIG. 6, FIG. 6 illustrates an example display screen or a user interface 110 of a viewer used by a user, such as an attorney, to view electronic transcripts 22 and exhibits 24 associated therewith that are contained within the computer program product 20. In one embodiment, the user interface 110 of FIG. 6 will be created once the viewer launches, which may be self-activating. As shown in FIG. 6, the viewer may contain a transcript pane 112 for displaying a list of electronic transcripts 22 contained in the product 20; an exhibit pane 114 for displaying a list of exhibits 24 contained on the CDROM; a first viewer window 116 for viewing, scrolling through, and searching in electronic transcripts 22 displayed therein; and a second viewer window 118 for displaying the images of a selected exhibit 24. In this way, the user may select an electronic transcript 22 for viewing, and as the user views and scrolls through the electronic transcript 22, the user may immediately and easily display the associated exhibit 24 referenced in the text of the electronic transcript 22. Preferably, both the electronic transcript viewer window 116 and the exhibit viewer window 118 are able to be simultaneously viewed on a computer display screen so that the user may easily view both windows during use. Notice, exhibit list 24 could, optionally, not be displayed as the exhibit window will display exhibits clicked on, or the like, from the transcript. Further, if the exhibit list is displayed, exhibits could be accessed directly.

Hence, it can been seen that embodiments of the present invention may be used by a court reporter or other party to produce a product having one or more transcripts and associated exhibit images along with an executable viewer. The court reporter could then provide the product to a customer such as an attorney, and the attorney can view the transcripts and exhibit images without the need for any additional software other than what is already present on the product.

As described above, embodiments of the invention can be embodied in a computer program product, such as, a file, a CDROM or other medium or media, persistent or temporary. The product could be accessible locally or remotely via a network. While the methods disclosed herein have been described and shown with reference to particular steps performed in a particular order, it will be understood that these steps may be combined, subor reordered to form an equivalent method without departing from the teachings of the present invention. Accordingly, unless specifically indicated herein, the order and grouping of the steps is not a limitation of the present invention.

While the invention has been particularly shown and described with reference to various embodiments thereof, it will be understood by those skilled in the art that various other changes in the form and details may be made without departing from the spirit and scope of the invention.

What is claimed is:

1. A method for making a computer program product comprising electronic transcript and exhibit files, comprising:

importing, by a processor, one or more electronic transcript files and one or more electronic exhibit files into a publisher module;

establishing, by the processor, an operable electronic link between the one or more electronic exhibit files and one or more entries in the one or more electronic transcript files that are associated with the one or more electronic exhibit files;

storing a bundle on a computer readable medium via the processor and the publisher module, wherein the bundle comprises the one or more electronic transcript files, the one or more electronic exhibit files, the operable electronic link, and an executable viewer file to view the one or more electronic transcript files and the one or more electronic exhibit files, the computer readable medium comprising a portable device; and providing the one or more electronic transcript files in the bundle via the executable viewer file in the bundle and the one or more electronic exhibit files in the bundle in response to an input activating the operable electronic link via the one or more entries in the one or more provided electronic transcript files.

2. The method of claim 1, wherein the portable device comprises a magnetic disk, an optical disk, a tape, a CD-ROM disk, a DVD disk, or a removable hard disk.

3. The method of claim 1, wherein the processor has local access to the computer readable medium that stores the bundle comprising the one or more electronic transcript files, the one or more electronic exhibit files, the operable electronic link, and the executable viewer file.

4. The method of claim 1, wherein the processor has remote access to the computer readable medium that stores the bundle comprising the one or more electronic transcript files, the one or more electronic exhibit files, the operable electronic link, and the executable viewer file.

5. The method of claim 4, wherein the processor has the remote access to the computer readable medium that stores the bundle through a network.

6. The method of claim 5, wherein the network comprises at least one of a local area network, a wide area network, a wireless network, an Ethernet network, or an optical network.

7. The method of claim 1, further comprising:
establishing a network connection between the processor and the computer readable medium that stores the bundle comprising the one or more electronic transcript files, the one or more electronic exhibit files, the operable electronic link, and the executable viewer file; and
launching, via the processor, the executable viewer file in the bundle, wherein the launched executable viewer file downloads or streams the one or more electronic transcript files and the one or more electronic exhibit files in the bundle to the processor over the established network connection.

8. The method of claim 1, wherein the operable electronic link between the one or more electronic exhibit files and the one or more entries in the one or more electronic transcript files comprises a hyperlink from the one or more entries in the one or more electronic transcript files to the one or more electronic exhibit files.

9. The method of claim 1, further comprising:
searching the one or more electronic transcript files to detect a first reference to the one or more electronic exhibit files in the one or more electronic transcript files; and
reading a page number and a line number associated with the first detected reference to the one or more electronic exhibit files in the one or more electronic transcript files, wherein the one or more entries in the one or more electronic transcript files that are associated with the operable electronic link include the first reference to the one or more electronic exhibit files in the one or more electronic transcript files.

10. The method of claim 1, further comprising:
searching the one or more electronic transcript files to detect all references to the one or more electronic exhibit files in the one or more electronic transcript files; and
reading page numbers and line numbers associated with all the references to the one or more electronic exhibit files in the one or more electronic transcript files, wherein the one or more entries in the one or more electronic transcript files that are associated with the operable electronic link include all the references to the one or more electronic exhibit files in the one or more electronic transcript files.

11. The method of claim 1, wherein the one or more entries in the one or more electronic transcript files that are associated with the operable electronic link include one or more user-defined page numbers and line numbers in the one or more electronic transcript files.

12. The method of claim 1, wherein the executable viewer file provides the one or more electronic transcript files and the one or more electronic exhibit files substantially simultaneously via a user interface having a transcript pane and an exhibit pane to respectively provide the one or more electronic transcript files and the one or more electronic exhibit files.

13. The method of claim 12, wherein the transcript pane and the exhibit pane associated with the user interface include independent controls to respectively add, view, and remove the one or more electronic transcript files and the one or more electronic exhibit files in the bundle.

14. The method of claim 1, wherein providing the one or more electronic transcript files and the one or more electronic exhibit files in the bundle via the executable viewer file in the bundle includes:
providing, via the executable viewer file, images associated with the one or more electronic transcript files in a transcript window that includes controls to view, search, and scroll through the images associated with one or more electronic transcript files; and
providing, via the executable viewer file, images associated with the one or more electronic exhibit files in an exhibit window in response to the input activating the operable electronic link via searching or scrolling through the images associated with one or more electronic transcript files to view the one or more entries in the one or more electronic transcript files that are associated with the one or more electronic exhibit files.

15. The method of claim 1, wherein the one or more electronic exhibit files include video files, audio files, video/audio files, animation files, text files, or image files.

16. A computer program product comprising electronic transcript and exhibit files, wherein the computer program product comprises a computer readable medium that stores:
an importing module configured to import one or more electronic transcript files and one or more electronic exhibit files;
an association module configured to establish an operable electronic link between the one or more electronic exhibit files and one or more entries in the one or more electronic transcript files that are associated with the one or more electronic exhibit files; and a bundle that comprises the one or more electronic transcript files, the one or more electronic exhibit files, the operable electronic link, and an executable viewer module configured to:
provide the one or more electronic transcript files in the bundle; and
provide the one or more electronic exhibit files in the bundle in response to an input activating the operable electronic link via the one or more entries in the one or more provided electronic transcript files, the computer readable medium comprising a portable device.

17. The computer program product of claim 16, wherein the importing module has remote access to the one or more electronic transcript files and the one or more electronic exhibit files through a network.

18. The computer program product of claim 16, wherein the computer readable medium comprises a magnetic disk, an optical disk, a tape, a removable hard disk, a CD-ROM disk, or a DVD disk.

19. The computer program product of claim 16, wherein the one or more electronic exhibit files include video files, audio files, video/audio files, animation files, text files, or image files.

20. The computer program product of claim 16, wherein the executable viewer module in the bundle is further configured to provide a remote processor access to the one or more electronic transcript files and the one or more electronic exhibit files in the bundle over a network connection.

21. The computer program product of claim 20, wherein the executable viewer module in the bundle is further configured to download the one or more electronic transcript files and the one or more electronic transcript files in the bundle to the remote processor.

22. The computer program product of claim 20, wherein the executable viewer module in the bundle is further configured to stream the one or more electronic transcript files and the one or more electronic transcript files in the bundle to the remote processor.

23. The computer program product of claim 16, wherein the operable, electronic link between the one or more electronic exhibit files and the one or more entries in the one or more electronic transcript files comprises a hyperlink from the one or more entries in the one or more electronic transcript files to the one or more electronic exhibit files.

24. The computer program product of claim 16, wherein the association module is further configured to:
search the one or more electronic transcript files to detect a first reference to the one or more electronic exhibit files in the one or more electronic transcript files; and
read a page number and a line number associated with the first detected reference to the one or more electronic exhibit files in the one or more electronic transcript files, wherein the one or more entries in the one or more electronic transcript files that are associated with the operable electronic link include the first reference to the one or more electronic exhibit files in the one or more electronic transcript files.

25. The computer program product of claim 16, wherein the association module is further configured to:
search the one or more electronic transcript files to detect all references to the one or more electronic exhibit files in the one or more electronic transcript files; and
read page numbers and line numbers associated with all the references to the one or more electronic exhibit files in the one or more electronic transcript files, wherein the one or more entries in the one or more electronic transcript files that are associated with the operable electronic link include all the references to the one or more electronic exhibit files in the one or more electronic transcript files.

26. The computer program product of claim 16, wherein the one or more entries in the one or more electronic transcript files that are associated with the operable electronic link include one or more user-defined page numbers and line numbers in the one or more electronic transcript files.

27. The computer program product of claim 16, wherein the executable viewer file is further configured to provide the one or more electronic transcript files and the one or more electronic exhibit files substantially simultaneously via a user interface having a transcript pane and an exhibit pane to respectively provide the one or more electronic transcript files and the one or more electronic exhibit files.

28. The computer program product of claim 27, wherein the transcript pane and the exhibit pane associated with the user interface include independent controls to respectively add, view, and remove the one or more electronic transcript files and the one or more electronic exhibit files in the bundle.

29. The computer program product of claim 16, wherein the executable viewer file is further configured to:
provide images associated with the one or more electronic transcript files in a transcript window that includes controls to view, search, and scroll through the images associated with one or more electronic transcript files; and
provide images associated with the one or more electronic exhibit files in an exhibit window in response to the input activating the operable electronic link via searching or scrolling through the images associated with one or more electronic transcript files to view the one or more entries in the one or more electronic transcript files that are associated with the one or more electronic exhibit files.

30. A system for making a computer program product comprising electronic transcript and exhibit files, wherein the system comprises a processor configured to:
import one or more electronic transcript files and one or more electronic exhibit files into a publisher module;
establish an operable electronic link between the one or more electronic exhibit files and one or more entries in the one or more electronic transcript files that are associated with the one or more electronic exhibit files;
store a bundle on a computer readable medium via the publisher module, wherein the bundle comprises the one or more electronic transcript files, the one or more electronic exhibit files, the operable electronic link, and an executable viewer file to view the one or more electronic transcript files and the one or more electronic exhibit files, the computer readable medium comprising a portable device; and
provide the one or more electronic transcript files in the bundle via the executable viewer file in the bundle and the one or more electronic exhibit files in the bundle in response to an input activating the operable electronic link via the one or more entries in the one or more provided electronic transcript files.

31. The system of claim 30, wherein the computer readable medium that stores the bundle comprising the one or more electronic transcript files, the one or more electronic exhibit files, the operable electronic link, and the executable viewer file comprises a magnetic disk, an optical disk, a tape, a CD-ROM disk, a DVD disk, or a removable hard disk.

32. The system of claim 30, wherein the processor has local or remote access to the computer readable medium that stores the bundle comprising the one or more electronic transcript files, the one or more electronic exhibit files, the operable electronic link, and the executable viewer file.

33. The system of claim 30, wherein the processor is further configured to:
- establish a network connection to the computer readable medium that stores the bundle comprising the one or more electronic transcript files, the one or more electronic exhibit files, the operable electronic link, and the executable viewer file;
- launch the executable viewer file to provide the one or more electronic transcript files and the one or more electronic exhibit files in the bundle; and
- download or stream the one or more electronic transcript files and the one or more electronic exhibit files in the bundle from the launched executable viewer file over the established network connection.

34. The system of claim 30, wherein the operable electronic link between the one or more electronic exhibit files and the one or more entries in the one or more electronic transcript files comprises a hyperlink from the one or more entries in the one or more electronic transcript files to the one or more electronic exhibit files.

35. The system of claim 30, wherein the processor is further configured to:
- search the one or more electronic transcript files to detect a first reference to the one or more electronic exhibit files in the one or more electronic transcript files; and
- read a page number and a line number associated with the first detected reference to the one or more electronic exhibit files in the one or more electronic transcript files, wherein the one or more entries in the one or more electronic transcript files that are associated with the operable electronic link include the first reference to the one or more electronic exhibit files in the one or more electronic transcript files.

36. The system of claim 30, wherein the processor is further configured to:
- search the one or more electronic transcript files to detect all references to the one or more electronic exhibit files in the one or more electronic transcript files; and
- read page numbers and line numbers associated with all the references to the one or more electronic exhibit files in the one or more electronic transcript files, wherein the one or more entries in the one or more electronic transcript files that are associated with the operable electronic link include all the references to the one or more electronic exhibit files in the one or more electronic transcript files.

37. The system of claim 30, wherein the one or more entries in the one or more electronic transcript files that are associated with the operable electronic link include one or more user-defined page numbers and line numbers in the one or more electronic transcript files.

38. The system of claim 30, wherein the processor is further configured to provide, via the executable viewer file, the one or more electronic transcript files and the one or more electronic exhibit files substantially simultaneously via a user interface having a transcript pane and an exhibit pane to respectively provide the one or more electronic transcript files and the or more electronic exhibit files.

39. The system of claim 38, wherein the transcript pane and the exhibit pane associated with the user interface include independent controls to respectively add, view, and remove the one or more electronic transcript files and the one or more electronic exhibit files in the bundle.

40. The system of claim 30, wherein the processor is further configured to:
- provide, via the executable viewer file, images associated with the one or more electronic transcript files in a transcript window that includes controls to view, search, and scroll through the images associated with one or more electronic transcript files; and
- provide, via the executable viewer file, images associated with the one or more electronic exhibit files in an exhibit window in response to the input activating the operable electronic link via searching or scrolling through the images associated with one or more electronic transcript files to view the one or more entries in the one or more electronic transcript files that are associated with the one or more electronic exhibit files.

41. The system of claim 30, wherein the one or more electronic exhibit files include video files, audio files, video/audio files, animation files, text files, or image files.

42. The system of claim 30, wherein the processor is further configured to:
- provide, via the executable viewer file, an electronic transcript pane that displays a list of the one or more electronic transcript files.

43. The system of claim 30, wherein the processor is further configured to:
- provide, via the executable viewer file, an exhibit pane that displays a list of the one or more electronic exhibit files.

44. The system of claim 30, wherein the processor is further configured to:
- provide, via the executable viewer file, an electronic transcript pane that displays a list of the one or more electronic transcript files; and
- provide, via the executable viewer file, an exhibit pane that displays a list of the one or more electronic exhibit files.

* * * * *